United States Patent
Petrov

[15] 3,693,745
[45] Sept. 26, 1972

[54] DRIVING AXLE FOR ELECTRIC VEHICLES

[72] Inventor: Ivan Yordanov Petrov, Sofia, Bulgaria

[73] Assignee: Nipkien, Sofia, Bulgaria

[22] Filed: May 11, 1970

[21] Appl. No.: 36,166

[30] Foreign Application Priority Data

May 9, 1969 Bulgaria..........................12214

[52] U.S. Cl. ..........................180/60, 105/52, 290/29, 310/67 R
[51] Int. Cl. .............................................B60k 7/00
[58] Field of Search........180/65, 60, 62, 55; 105/49, 105/50, 52, 53, 54, 55, 56, 57, 58, 59; 290/12, 15, 20, 29, 39, 49; 310/67

[56] References Cited

UNITED STATES PATENTS

| | | | |
|---|---|---|---|
| 1,264,748 | 4/1918 | Apple | 180/62 |
| R14,370 | 10/1917 | Davis | 105/59 UX |
| 1,338,042 | 4/1920 | Ross et al. | 180/62 |
| 887,483 | 5/1908 | Ledwinka | 180/65 UX |
| 1,222,465 | 4/1917 | Priest | 105/59 UX |
| 2,027,218 | 1/1936 | Armington | 180/60 X |

FOREIGN PATENTS OR APPLICATIONS 1,076,854    7/1967    Great Britain...............180/60

*Primary Examiner*—Benjamin Hersh
*Assistant Examiner*—Milton L. Smith
*Attorney*—Arthur O. Klein

[57] ABSTRACT

A driving axle for electric vehicles. An electric motor with field and armature rotating in opposite directions is mounted in a hollow beam. Two reduction gears of the planetary type are mounted in axle housings affixed at each end of the hollow beam, the axle housings rotatably mounting two coaxial vehicle wheels. One of the reduction gears is drivingly connected to one of the field and armature; the other of the reduction gears is drivingly connected to the other of the field and armature. Accordingly, one wheel is driven by the field, and the other wheel is driven by the armature.

7 Claims, 4 Drawing Figures

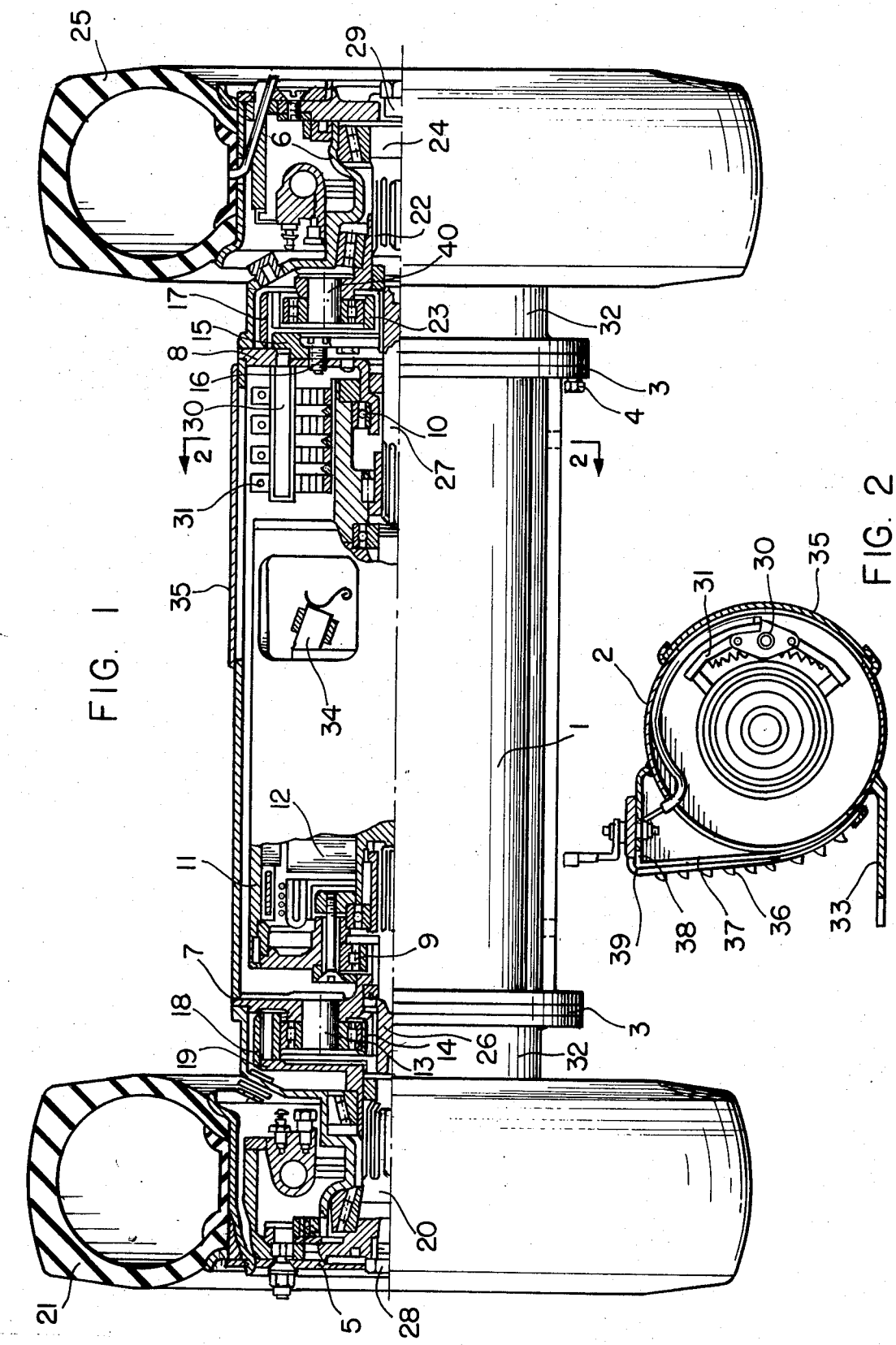

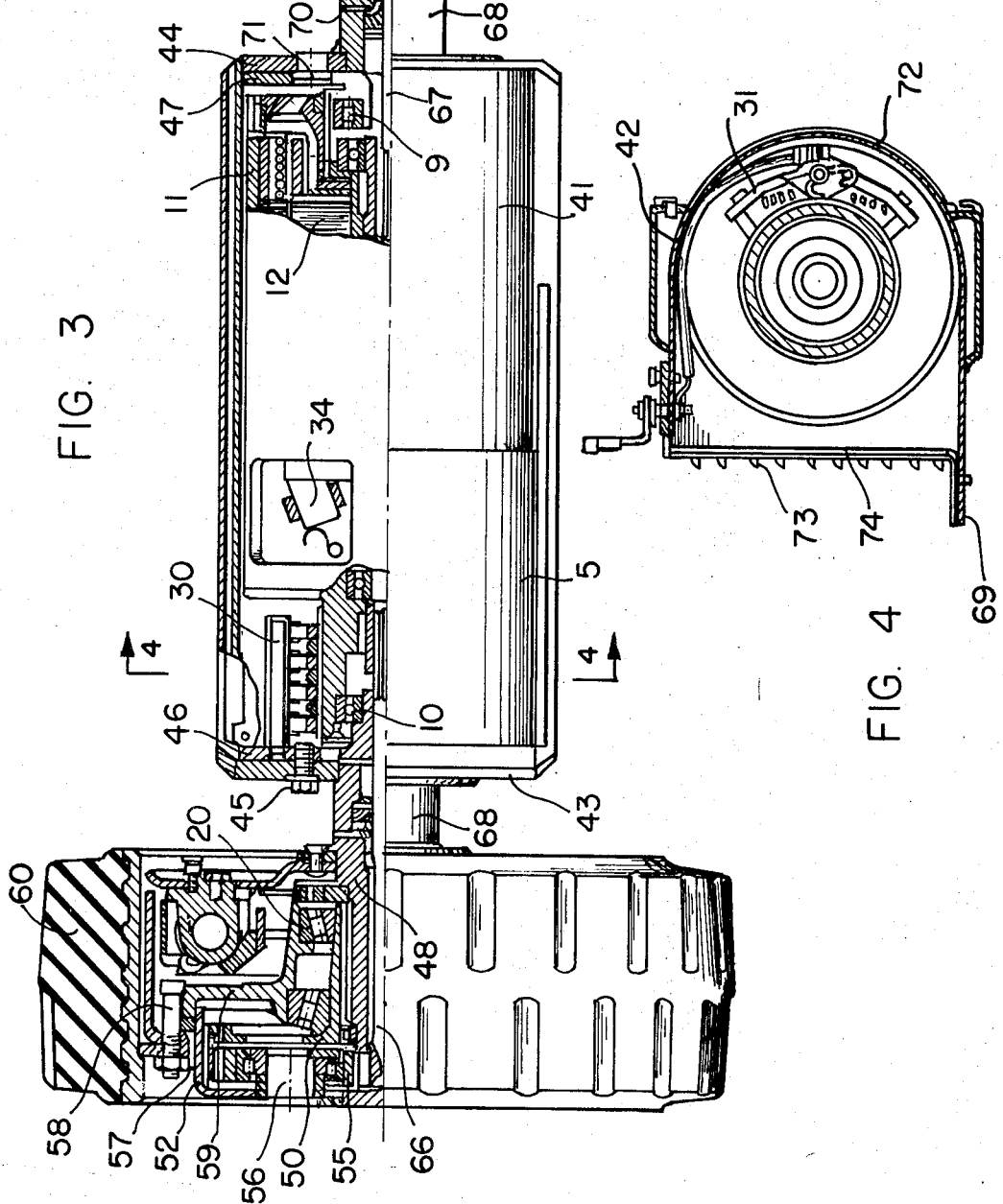

DRIVING AXLE FOR ELECTRIC VEHICLES

The present invention relates to a driving axle for electric vehicles, such axle being particularly characterized by its compact and lightweight design.

In known driving axles for electric vehicles, the transmission of the torque from the electric motor to the driving wheels takes place by means of double-reduction gears and toothed differential gears consisting of complex bevel toothed wheels, such gears being located and supported in metal boxes of large sizes and complicated, technologically unfavorable shapes, such axles require complex machining, as well as large quantities of high-quality metals.

Driving axles for electric vehicles with two electric motors, that are either independent or are built-in inside a common casing, are also known; these drive the road wheels by way of double-reduction chains or toothed mechanisms. Such a drive, however, is of large volume, it is complicated, it requires large quantities of high-quality metals and is, furthermore, of low efficiency.

The drawbacks of these drives are avoided to a certain degree by the invention disclosed in the Bulgarian Pat. No. 10,088. Provided in this same patent is an electric motor with a rotating field and armature, which is combined with double-reduction gears of the planetary type, built-in inside the road wheels. The double-reduction gears of this axle are complicated, they require a large volume, and they are heavy.

It is therefore, a general object of the present invention to improve and develop further the aforementioned invention, by providing a driving axle of reduced size and weight and of increased efficiency by using single-reduction planetary gears.

The present invention provides, in particular, a driving axle, wherein an electric motor with rotating inductor or field coil and armature are built-in coaxially inside a hollow beam, to both ends of which hollow axle housings are fastened, single-reduction gears of the planetary type being built-in in such axle housings.

The hollow beam can be shaped as a cylindrical member, a U-type member, or any other convenient type of casing; attached at both its ends are discs for supporting the electric motor and the axle housings for locating the single-reduction planetary gears.

One such reduction gear, for example, the left, is designed in such a way that pressed on to the left disc, for example, which remains fixed with respect to the casing, are the axles of the left internal toothed wheels or gears of the reduction gear, so that the motion which is transmitted to the left road wheel is taken from a left toothed rim, which turns round these internal toothed wheels and is connected by means of a splined or toothed sleeve to the hub of the road wheel.

The axles of the internal toothed wheels can also be satellites and transmit the motion directly to the road wheel, being pressed on to the rotating cover of the road wheel, while the toothed rim around which they turn is fixed immovably by means of a left toothed sleeve to the immovable part of the axle.

In both cases, the internal toothed gears receive their motion from the one output shaft of the motor, with which they are in engagement.

The other reduction gear, which is located in the other axle housing, in the first-described embodiment is attached to the right disc, for example, by means of a sleeve, is a right internal toothed rim or ring gear which is fixed. Turning round inside such ring gear are right satellite wheels, whose guide or supporting frame is connected by means of a spined connecting means to the rotating hub of the right road wheel.

In the second described embodiment, the right reduction gear can be designed in such a way, that its right toothed rim can be attached by means of a second right toothed or splined sleeve to the rotating hub of the right road wheel.

In both embodiments of the second reduction gear, the motion of the right output shaft of the electric motor is taken up by the internal toothed wheels.

The hubs of the road wheels are supported in the respective axle housings. They are fixed axially by means of bolts, which pass through holes made in the axles of the hubs themselves.

In order to attach the driving axle to the vehicle, there are journal sleeves surrounding the axle housings 5 and 6 and attached to the ends of the tube 2. A longitudinal eye is welded to the casing and cooperates with a portion of the vehicle to hold the axle in place.

For a better understanding of the invention, reference should be had to the accompanying drawings in which there is illustrated a preferred embodiment of the invention.

In the drawings:

FIG. 1 is a view partially in elevation and partially in longitudinal section through the driving axle of a first embodiment;

FIG. 2 is a transverse section through the cylindrical casing inside which the electric motor is built-in, the section being taken along the line 2—2 of FIG. 1 looking in the direction of the arrows;

FIG. 3 is a view partially in elevation and partially in longitudinal section through a second embodiment of the driving axle; and FIG. 4 is a transverse section through the U-shaped casing inside which the electric motor is built-in, the section being taken along line 4—4 of FIG. 3.

Turning now to the embodiment shown in FIGS. 1 and 2, the immovable casing 1 of the axle consists of a cylindrical tube 2 with flanges 3 at both its ends, the protective housings 5 and 6 being fastened to the tube 2 by means of the bolts 4.

For a better understanding, it is assumed that the axle housing 5 is a left one (FIG. 1) and that all elements on this side are left, whereas the axle housing 6 is a right one (FIG. 1) and all elements on this side are right. Pressed immovably between the flanges 3 and the axially inner ends of the housings 5 and 6 are the discs 7 and 8. Disc 7, by means of the left bearing 9, is the rotating inductor or field 11 of an electric motor, whose field 11 and armature 12 rotate simultaneously. The armature 12 of the motor is supported by bearing 10 on right disc 8. Built-in inside the spaces between the housings 5 and 6 and the discs 7 and 8 are single-reduction gears of the planetary type. Pressed on to the left disc 7 are immovable axles 13, on which are supported the left internal toothed wheels 14 of the left reduction gear. Attached immovably to the right disc 8 by means of a right toothed sleeve 15 and bolts 16 is the toothed rim 17 of the right reduction gear. The rotating toothed rim 18 of the left reduction gear is connected by means of the toothed sleeve 19 to the hub 20 of the left road wheel 21 of the vehicle, while the rotating guide or frame 22 for supporting the satellite toothed wheels 23 of the right reduction gear is connected by means of slots or splines to the hub 24 of the right road wheel 25. The field or inductor 11 and the armature 12 of the motor transmit their rotation to the right satellite toothed wheels 23 and the left internal toothed wheels 14, respectively, by means of shafts 27 and 26. The hubs 20 and 24 have a central hole in each, through which they are fixed axially by means of the bolts 28 and 29. Attached to the inner side of the right disc 8 is a support 30, which carries the current-supplying brushes 31 of the electric motor. Shaped to the housings 5 and 6 are the journals 32 which surround them, and welded to the cylindrical tube 2 is an eye 33 by means of which the axle is attached to the chassis of the vehicle. A hole is provided in the front side of the cylindrical tube 2 for servicing the current-supply brushes 31 and the commutator brushes 34, such hole being closed by cover 35. A hole is provided in the rear side of the cylindrical tube 2, such hole being closed by perforated cover 36, the holes of which are covered by a fine net or screen 37. Welded to the upper rear side of the cylindrical tube 2 is a bracket 38, to which the terminal board is attached.

The apparatus of FIGS. 1 and 2 operates as follows: When a voltage is injected in the brushes 31 of the electric motor, the field 11 and the armature 12 rotate in different directions, but the torques are equal. By means of the right shaft 27 and the left shaft 26 the rotation is transmitted to the toothed wheels—the right wheels 23 and the left wheels 14 respectively, which for their part induce the rotation, in the same direction, of the guide 22 and the toothed rim 12, respectively. The toothed rim 18 induces, by means of the left toothed sleeve 19 and the hub 20, the rotation of the left road wheel 21, and the right guide 22 induces, by means of the hub 24, the rotation of the right road wheel 25.

In the second embodiment of the driving axle, the immovable casing 41 consists of a U-shaped box 42, both of whose ends are closed by the walls 43 and 44. Fastened to the left and right ends of the box 42, respectively, by means of bolts 45 are discs 46 and 47, the one being left and the other being right. As in the first embodiment, supported by discs 46 and 47 by means of bearings 9 (right) and 10 (left) is the rotating field 11 of an electric motor whose field 11 and armature 12 rotate in opposite directions. The end walls 43 and 44 of casing 41 are extended by the axle housings 48 and 49. Attached immovably to the outer end on the surface of the left housing 48 by means of slots or splines is a left toothed sleeve 50, and similarly attached immovably by means of slots or splines to the outer end on the surface of the right axle housing 49 is a guide or frame 51, which is the same for each of the two single-reduction gears of the planetary type employed. Attached to the toothed sleeve 50 of the left reduction gear is a toothed rim 52, and pressed on to the guide 51 of the right reduction gear are axles or stub shafts 53, on which are carried the right toothed wheels 54. The satellite left toothed wheels 55 of the left reduction gear are seated on the axles 56, which are pressed on to the cover 57, and the latter is connected by means of the bolts 58 to the hub 59 of the left road wheel 60. The toothed rim 61 of the right reduction gear is connected by means of the right toothed sleeve 62 and the bolts 63 to the hub 54 of the right road wheel 65. The field 11 and the armature 12 transmit their rotation to the toothed wheels 55 and 54, respectively, by means of the shafts 66 and 67. Surrounding the axle housings 48 and 49 are journals 68; attached to the rear side of the U-shaped box 42 is an eye 69 by means of which the driving axle is attached to the chassis of the vehicle. Drilled in the upper side of the journals 68 are holes 70, which serve as vents for the reduction gears. Drilled through the right wall 44 and the disc 47 are holes 71 which serve for venting the electric motor. Provided in the projecting side of the U-shaped box 42 is an opening for servicing the current-supplying brushes 31 and the commutator brushes 34, such opening being closed by cover 72. The open side of the U-shaped box 42 is closed by a perforated cover 73, whose holes are covered with a fine screen 74.

In the embodiment of FIGS. 3 and 4, by analogy with the first embodiment, when a voltage is injected in the brushes 31, the field 11 and the armature 12 rotate in different directions, but the torques are equal. By means of the left shaft 66 and the right shaft 67 rotary motion is transmitted to the tooth wheels—the left wheel 55 and the right wheel 54. These tooth wheels for their part induce the rotation in the same direction of the left cover 57 and of the right toothed rim 61, respectively. The cover 57 induces, by means of bolts 58, the rotation of the left road wheel 60, and the toothed rim 61 induces, by means of the sleeve 62 and the bolts 63, the rotation of the hub 64 of the right road wheel 65.

Although the invention is illustrated and described with reference to a plurality of preferred embodiments thereof, it is to be understood that it is in no way limited to the disclosure of such a plurality of preferred embodiments, but is capable of numerous modifications within the scope of the appended claims.

What is claimed is:

1. A driving axle for electric vehicles comprising a hollow casing, an electric motor with its field and armature rotating in opposite directions disposed within the casing, disc-like members affixed to the casing rotatably supporting the field and armature of the motor, axle housings affixed to the opposite ends of the casing, driving wheels rotatably mounted on the axle housings, a speed changing gear mechanism interposed between and drivingly connected to the armature and the wheel at one axle housing, and a speed changing gear mechanism interposed between and drivingly connected to the field and the wheel at the other axle housing, current-supplying brushes for said electric motor, a support for said brushes mounted on one of said disc-like members, said hollow casing having a hole on one side thereof for servicing the current-supplying brushes, said hole being closed by a cover, another ventilating hole being provided at the other side of the hollow casing, a perforated cover closing said other hole, and load bearing sleeves journalled upon axially inner portions of said axle housings, holes being drilled in the upper side of said sleeves to serve as vents for the speed changing gear mechanism, and holes for venting the electric motor drilled in at least the right disc-like member.

2. A driving axle according to claim 1, wherein said disc-like members are affixed to the casing for supporting the electric motor and are secured to and span the ends of the hollow casing, the axle housings being in end-to-end alignment with the hollow casing with the respective disc-like member interposed therebetween, and means securing the axle housings and disc-like members to the hollow casing.

3. A driving axle according to claim 1, wherein the speed changing gear mechanisms are single reduction gear sets of the planetary type.

4. A driving axle according to claim 3, wherein the planetary gear sets are mounted within the respective axle housings.

5. A driving axle according to claim 4, wherein the means affixed to the casing for supporting the electric motor are disc-like members secured to and spanning the hollow casing outwardly of the motor, each of the planetary gear sets having a ring gear, satellite gears, and a sun gear one of which is fixed to the respective disc-like member and the other two of which are rotatable with respect thereto.

6. A driving axle according to claim 5, wherein the satellite gears of one planetary gear set are journalled on axles which are fixedly supported on the disc-like member associated with one wheel, and the ring gear of the other planetary gear set is fixed with respect to the disc-like member associated with the other wheel, whereby the two driving wheels are driven in the same direction by the respective oppositely rotating inductor and armature of the motor.

7. A driving axle as set forth in claim 1, comprising a bracket which is welded to the upper rear side of the hollow casing, and comprising a terminal board attached to said bracket.

* * * * *